Jan. 24, 1950 G. E. GRIMM 2,495,520
MOTOR VEHICLE
Filed Dec. 18, 1945 5 Sheets-Sheet 1

INVENTOR.
George E. Grimm,
BY
Davis, Lindsey, Smith & Shonts
Attys.

Jan. 24, 1950　　　　　G. E. GRIMM　　　　　2,495,520
MOTOR VEHICLE
Filed Dec. 18, 1945　　　　　　　　　　5 Sheets-Sheet 5

INVENTOR.
George E. Grimm,
BY
Davis, Lindsey, Smith & Shonts
Attys

Patented Jan. 24, 1950

2,495,520

UNITED STATES PATENT OFFICE 2,495,520

MOTOR VEHICLE

George E. Grimm, Detroit, Mich., assignor to Packard Motor Car Company, Detroit, Mich., a corporation of Michigan Application December 18, 1945, Serial No. 635,743

9 Claims. (Cl. 296—65)

The invention relates generally to motor vehicles and more particularly to a motor vehicle adapted for taxicab use.

The general object of the invention is to provide a motor vehicle of the foregoing character, having a novel seating arrangement for passengers, including both rear and front seats, all of which are accessible through doors at both sides of the vehicle.

More specifically, it is an object to provide a motor vehicle of the foregoing character, having a novel seating arrangement including a driver's seat partitioned off from the passenger seating portion of the vehicle, and both front and rear seats for passengers, all of which are accessible through doors at both sides of the vehicle so that passengers for any of the seats may enter and leave the vehicle at either side.

Another object is to provide a motor vehicle of the foregoing character having a novel seating arrangement including a swingable forwardly facing front seat for passengers, which permits access thereto from the rear seat area, the swingable seat being adapted to be locked in its forward or normal position, with the lock releasable either from the passenger-seating area or from the driver's seat.

A further object is to provide a motor vehicle of the foregoing character, having a novel seating arrangement including a driver's seat at one side, partitioned off from both rear and front passenger seats, with a portion of the partition releasable to permit the driver to leave the vehicle on the side opposite his seat in case of necessity.

Other objects and advantages will become apparent from the following description taken in connection with the accompanying drawings, in which.

Figure 1:
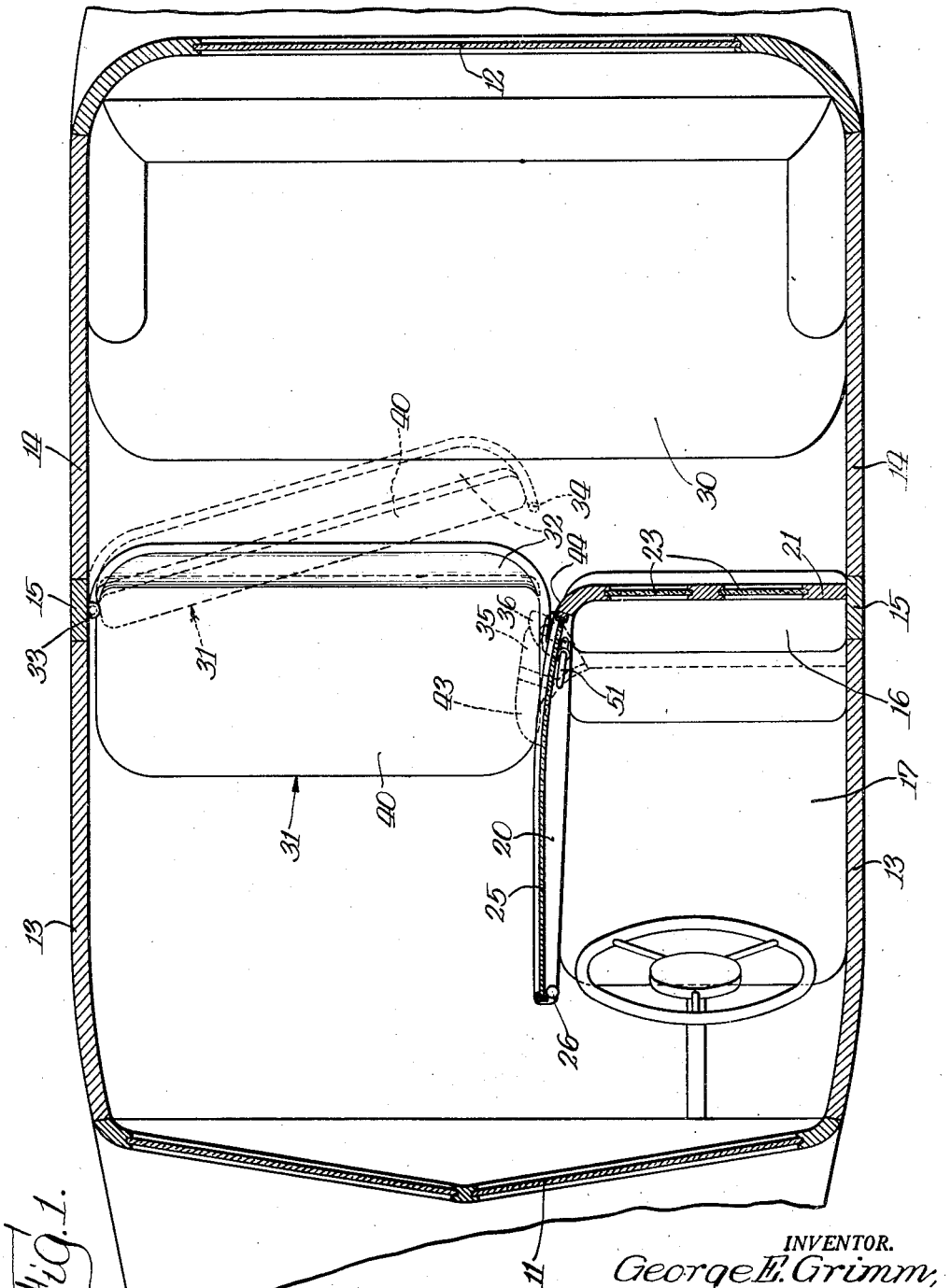
Figure 1 is a fragmentary horizontal sectional view of a motor vehicle embodying the features of the invention.
Figure 2:
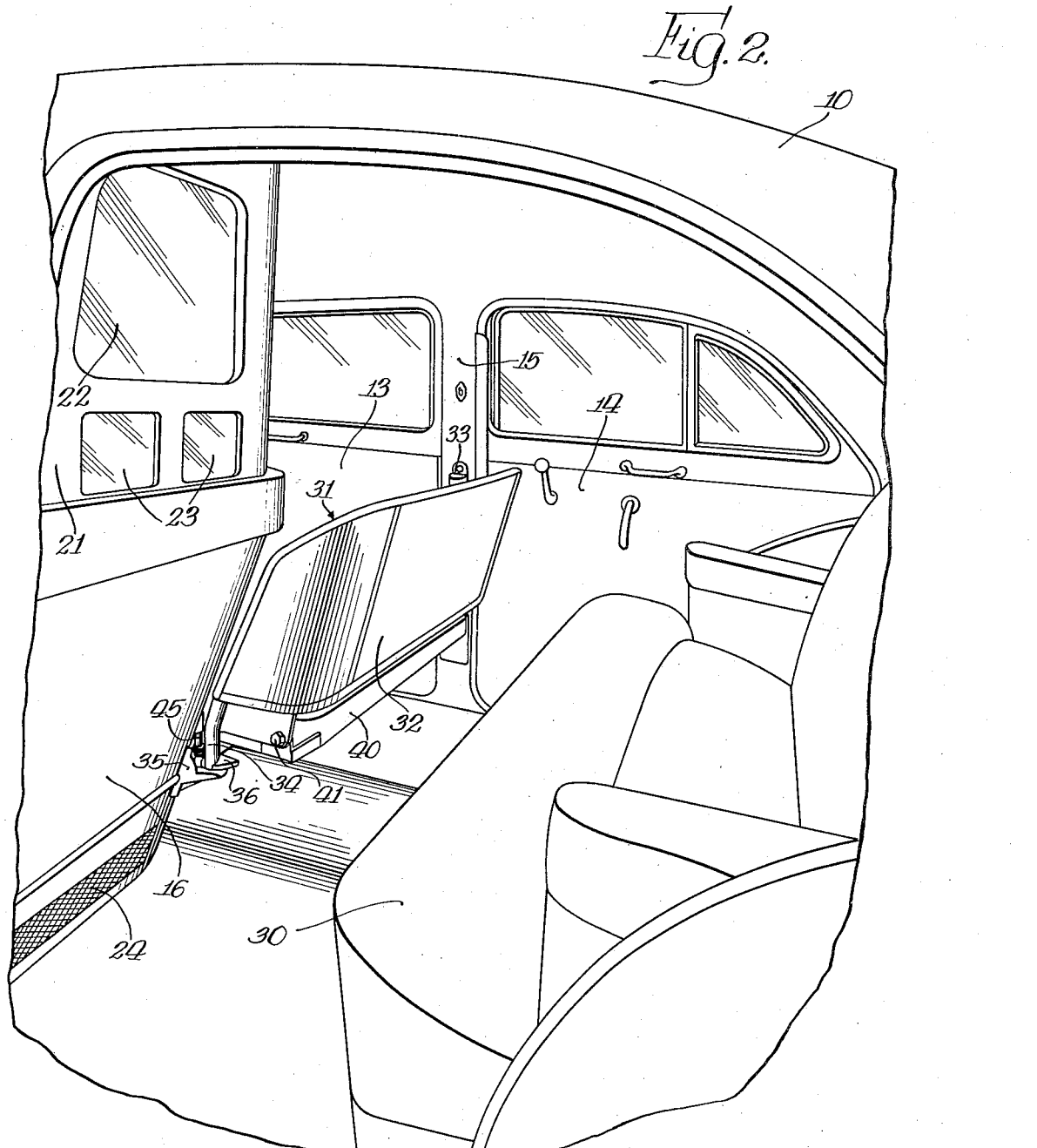
Fig. 2 is a fragmentary perspective view showing the interior of the vehicle as viewed through the left rear door and showing the front seat in its operative position.
Figure 3:
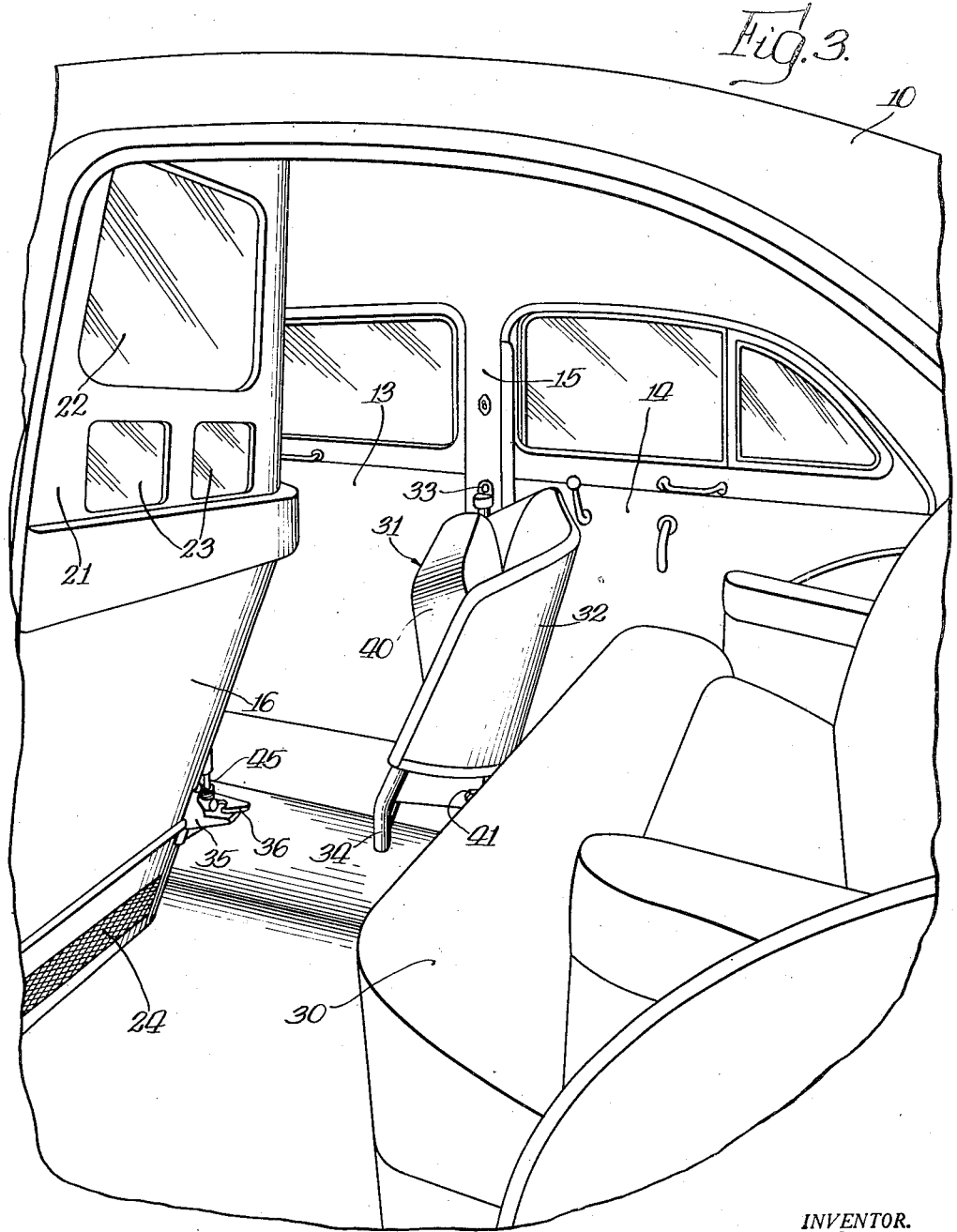
Fig. 3 is a view similar to Fig. 2, but showing the front seat in the rearwardly swung position.

A number of cities have made changes in their vehicle laws with regard to taxicabs which make it necessary to alter the construction of the cabs considerably from what has heretofore been considered as the conventional arrangement. One of these changes in the municipal laws is that there must be a partition between the driver and the passengers. Another is that all of the passengers in the vehicle must be able to enter and leave the vehicle at either side.

As to the first-mentioned change relating to the partitioning of the driver's seat, such partition may, of course, in part be of a permanent nature. However, if the driver's seat, which occupies only one side of the front portion of the interior of the vehicle, is completely surrounded on its inner side by permanent partitions, difficulties would arise in case of an accident, if the door on the driver's side became wedged and unopenable. It follows that, while the driver's seat should be completely partitioned off from the rest of the interior of the vehicle in normal operation, such partition should include a removable or swingable section permitting the driver, when occasion demands, to gain access directly from his seat to the other portion of the interior of the vehicle so that, should the door on his side of the car become jammed, he may leave the car from the opposite side.

Since the driver does not need the entire space across the front of the car, that is, from one front door to the other, the space from the inner side of the driver's seat to the opposite front door may be utilized as passenger-carrying space. However, with the driver's seat partitioned off from the rest of the front area, access to such front area could be obtained only through one front door, unless provision were made for access from such front area into the area of the rear seat. The latter area, of course, is accessible at both sides of the car through the rear doors on both sides. To provide permanent passage space from the passenger-carrying area in the front to the rear seat area decreases the seating capacity of such front area.

With the foregoing in view, my present invention involves a seating arrangement which meets the requirements of the above-mentioned changes in municipal laws and provides for seating of a maximum number of passengers in the areas available. To this end, I provide a driver's seat in the front portion of the interior of the car and adjacent one of the side doors. The driver's seat is provided with a partition which includes a permanent portion at the rear of the driver's seat and a releasable or swingable portion at the inner side of the driver's seat, which swingable portion may be opened in cases of necessity to permit the driver to have access to the opposite side of the front area. The rear seat is conventional in form and is spaced rearwardly from the driver's seat and extends from one rear door to the other so that access thereto may be had from either of the rear doors.

A forwardly facing front seat is also provided for passengers, which extends from the inner side of the driver's seat to the opposite front door, when the seat is positioned to receive passengers. This front seat, however, is shiftable rearwardly, preferably by being pivoted at its outer end, so that passengers may pass between the front seat area and the rear seat area. Thus, a front seat passenger may have access thereto either through the front door on the side on which said front seat is located or by passing into the rear seat area and thence through the rear door on the opposite side of the vehicle. The front seat is preferably constructed with a folding seat portion adapted to be raised to a vertical position compactly against the back of the seat to increase the passageway between the front and rear areas. When the front seat is in its passenger-receiving position, it is preferably supported not only by its pivot, which in this case is adjacent the side doors, but at its inner end by means of a bracket provided on the structure of the driver's seat. When in such position and so supported, it is adapted to be held by a latch which may be released either by a handle located on the passenger side of the driver's seat or by a handle available to the driver inside of the partitions enclosing his seat.

In the specific embodiment disclosed in the drawing, I show a fully enclosed body having the usual top 10, windshield 11, and rear window 12. At both sides of the body are front doors 13 and rear doors 14 separated by pillars 15 extending from the floor to the top 10. The particular arrangement herein disclosed is for a left-hand drive, but the various parts hereinafter described may, of course, be reversed from the arrangement shown if the vehicle is to be of the right-hand drive type.

Mounted in the front portion of the interior of the vehicle and adjacent one of the front doors 13 is a driver's seat comprising a back structure 16 and a seat cushion 17. The driver's seat is preferably provided at its inner side with an arm structure 20 extending forwardly from the back 16. In order to separate the driver's seat from the rest of the interior of the vehicle, a partition 21 is provided at the rear of the driver's seat. The partition 21 extends upwardly from the back structure 16 and is provided throughout the major portion of its area with a window 22. It preferably also is provided with a pair of small panels 23 adapted to receive and display the driver's license and other data. A heater is preferably mounted under the driver's seat and arranged to discharge warm air into the rear seat area through a grille 24.

Figure 5:
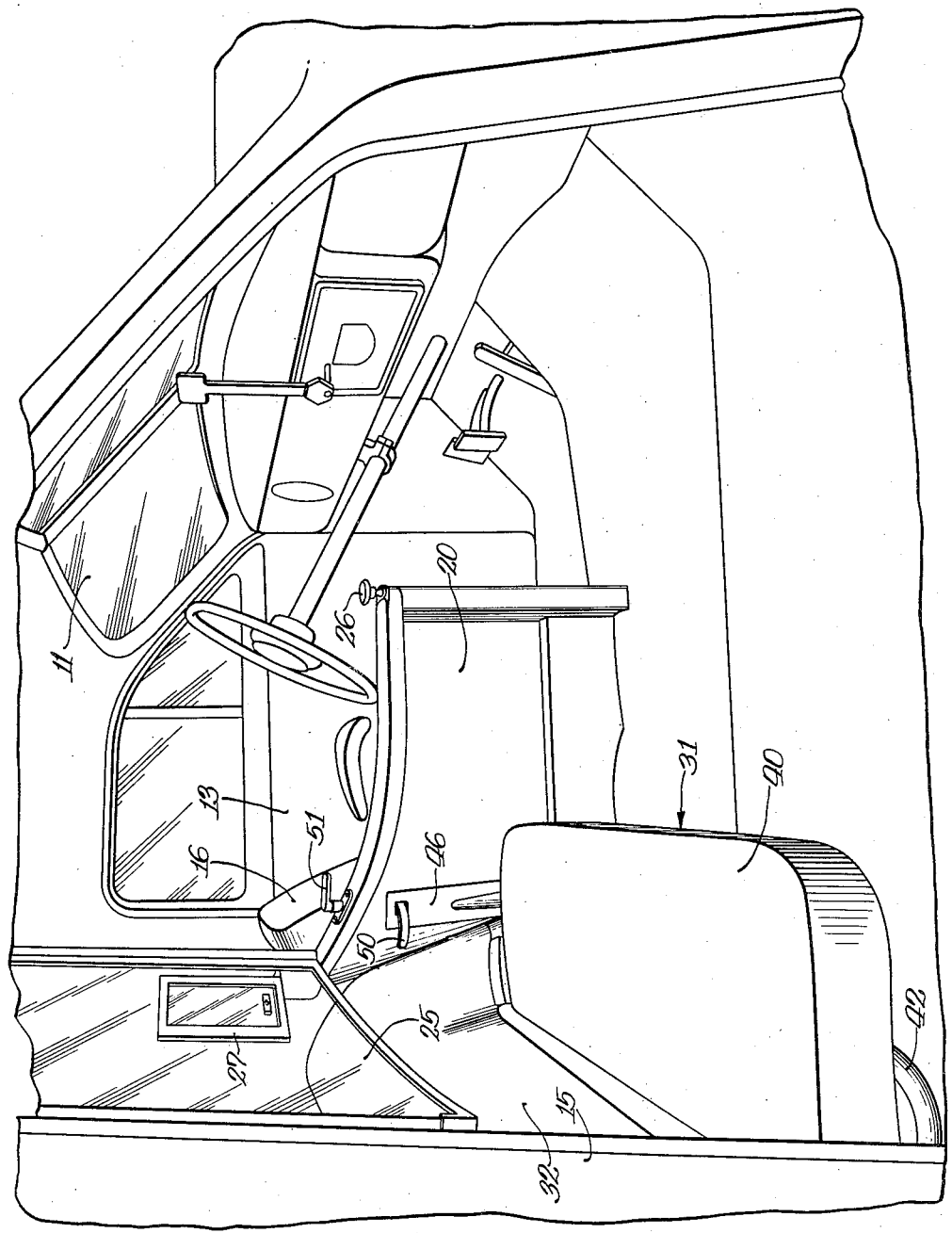
Fig. 5 is a fragmentary perspective view showing the interior of the front seat area when seen through the right front door and showing the front seat in its forward or operative position.

To complete the partitioning of the driver's seat from the rest of the interior of the vehicle, a partition 25 is provided along the arm structure 20 and extending upwardly therefrom. Since there are occasions when it is desirable to permit the driver to gain access directly from his seat into the passenger-carrying space, the partition 25 is preferably mounted for swinging movement. To this end, the partition 25 is pivotally supported by the permanent rear partition 21 so that the partition 25 may be swung from a closed position where it extends upwardly from the arm structure 20 to a sidewardly extending position over the adjacent front seat, as shown in Fig. 5. When the partition 25 is in its normal position above the arm structure 20, it is adapted to be held in place by a locking means at its front lower corner, securing such corner to the arm structure 20. To release the locking means, a handle 26 may be provided, which handle is readily accessible to the driver when in his seat. A similar locking means (not shown) may also be provided to secure the upper front corner of partition 25 to the top 10. The partition 25 is preferably made of a plastic material and may be provided with a swinging section 27 to permit the driver to receive fares from a passenger when in the vehicle.

The main passenger-carrying space is provided by a rear seat 30 extending crosswise of the vehicle and, of course, spaced rearwardly from the driver's seat to provide leg room. The rear doors 14 are preferably quite wide and, when open, expose the rear seat 30 so that a passenger may enter or leave such seat with ease.

Additional passenger-seating space is provided in a vehicle embodying the present invention by a front seat, indicated generally at 31. The front seat 31, when in its normal or passenger-carrying position, is adapted to extend from the inner side of the driver's seat to the opposite side of the vehicle adjacent the front door on said opposite side. Thus, access may be had to the front seat 31 through the adjacent front door. However, one of the requirements of the new municipal laws heretofore mentioned is that such a front seat must be accessible from both sides of the car. Since the driver's seat is partitioned off from the rear of the interior of the car, the front seat 31 and its adjacent area is made accessible from the rear seat area. As mentioned above, a permanent passageway from such front area to the rear area would decrease the seating capacity of the front seat. For that reason, the front seat 31 is provided with a shiftable construction so that it may be moved sufficiently to permit passage from the front area to the rear area. In the preferred form of construction, the front seat is pivotally supported adjacent its outer end so that its inner end may be swung rearwardly, as indicated by the dotted-line position in Fig. 1, to provide a passageway around the inner end of the front seat between the two areas. In the preferred form of construction, the front seat comprises a supporting structure 32 which constitutes the back of the seat. At its outer end the supporting structure 32 is pivotally supported, as indicated at 33, on the adjacent pillar 15 between the front and rear doors.

The inner end of the supporting structure is adapted to be carried, when in passenger-receiving position, by means provided on the arm structure 20. The supporting structure 32 in the embodiment illustrated includes a downwardly extending leg 34 at its inner end, which leg is adapted to rest on a bracket 35 secured to the arm structure 20 and constituting the supporting means. The leg 34, in order to prevent its being dislodged from its normal position when carrying passengers, is adapted to be secured to the bracket by a latch 36 in the form of a hook engageable about the lower end of the leg 34. The latch 36 is preferably spring operated so that it will automatically engage the leg 34 when the seat is swung forwardly.

Figure 4:
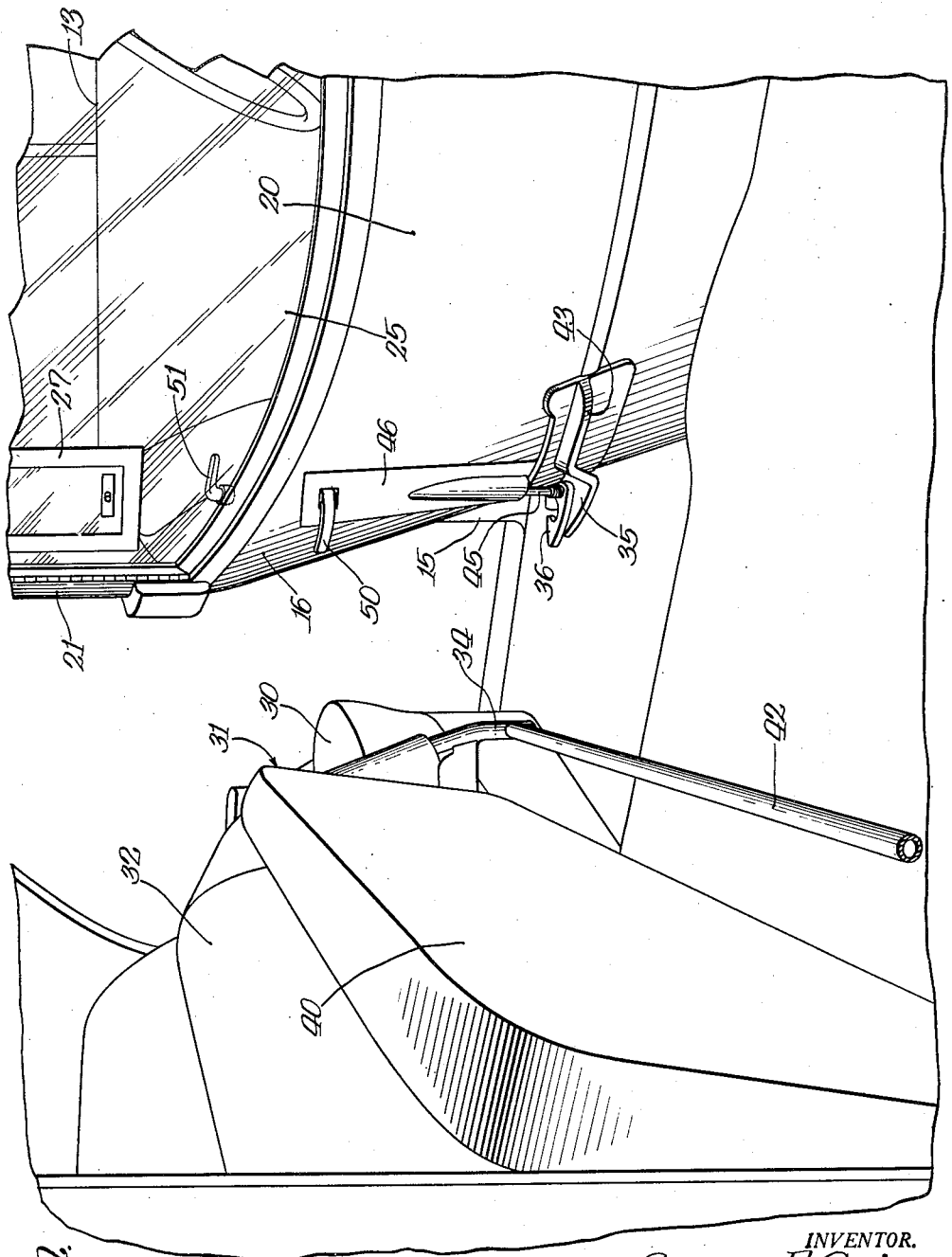
Fig. 4 is a fragmentary perspective view of the interior of the vehicle as seen from the right front door and showing the front seat swung rearwardly.

The front seat 31 also includes a seat portion 40 which preferably may be folded to an out-of-the-way position when the seat is swung rearwardly, so as to increase the size of the passage between the front and rear areas. To this end, the seat portion 40 is pivotally supported by the structure 32 on an axis, indicated at 41, extending along the rear edge of the seat portion. The supporting structure 32 of the front seat also includes a bar 42 (see Fig. 4) parallel to and spaced forwardly from the pivotal axis of the seat portion, which bar will support the seat portion 40 when the latter is lowered. The seat portion 40 is also supported by a forward extension 43 on the bracket 35 when the seat portion 40 is lowered and the front seat is moved to its normal or forward position.

From the foregoing, it will be apparent that with the front seat swung rearwardly and its seat portion 40 raised, ample space is provided between the inner end of the front seat and the driver's seat to permit passage therethrough from the rear seat area to the front seat area. Such passage space is increased by rounding the inner rear corner of the driver's seat, as indicated at 44 in Fig. 1. The rear face of the driver's seat is forwardly and downwardly slanted so that the bracket 35 and its latch 36 do not materially project into such passage space to form any obstruction therein.

The latch 36 is releasable either from the passenger-carrying space or from the driver's seat. To this end, the latch 36 is carried on a shaft 45 (see Fig. 4) which extends upwardly within the arm structure 20 of the driver's seat. Preferably, the shaft 45 is carried in a panel structure 46 embedded in the arm structure 20. Adjacent the upper end of the panel 46 a handle 50 is secured to the shaft 45, which handle may be grasped by any of the passengers to release the latch 36. The latch 36 may also be released through operation of the shaft 45 by means of a handle 51 on the driver's seat side of the partition 25. Preferably, the handle 51 is mounted on the upper end of the shaft 45 at the top surface of the arm structure 20.

The construction disclosed herein provides a driver's seat which is separated from the rest of the interior of the car by partitions which normally enclose the driver's seat. The side partition 25, however, may be swung away from the arm structure 20 in case it is necessary for the driver to pass directly from his seat into the adjacent front seat area. The front seat 31 is of sufficient size to carry two passengers so that a maximum carrying capacity for the vehicle is thereby provided with all passengers facing forwardly. The front seat passengers may gain access to the seat either from the right front door 13 or from the left rear door 14. Thus, the present construction is such as to meet the requirements of the municipal laws relative to the foregoing features. The front seat, when in its forward position, is adequately supported at both ends, and the latch 36 retains the inner end in its forward, supported position.

I claim:

1. A motor vehicle for taxicab use comprising a closed body having front and rear doors at both sides, a driver's seat adjacent the front door at one side of the body and having an arm structure along its inner side, a rear seat spaced rearwardly from said driver's seat and extending adjacent both rear doors, and a front seat pivotally supported at its outer end adjacent the front door at the opposite side with its inner end swingable rearwardly to permit access from the front seat to the space between the rear seat and the driver's seat, a bracket mounted on said arm structure to support the inner end of said front seat when swung forwardly, a latch on said bracket for holding the inner end of the front seat in supported position, and means extending upwardly in said arm structure and provided with handle means at its upper end for releasing said latch.

2. A motor vehicle for taxicab use comprising a closed body having front and rear doors at both sides, a driver's seat adjacent the front door at one side of the body and partitioned at its rear and inner sides from the rest of the interior of the body, a rear seat spaced rearwardly from said driver's seat and extending adjacent both rear doors, and a front seat pivotally supported at its outer end adjacent the front door at the opposite side with its inner end swingable rearwardly to permit access from the front seat to the space between the rear seat and the driver's seat, means at the inner side of the driver's seat for supporting the inner end of the front seat when swung forwardly and including a latch for holding the front seat in its forward position, and means for releasing said latch including a pair of handles, one being located within said partition for actuation by the driver and the other located outside of said partition for actuation by a passenger.

3. A motor vehicle for taxicab use comprising a closed body having front and rear doors at both sides, a driver's seat adjacent the front door at one side of the body and having an arm structure along its inner side, a partition extending upwardly from the rear of said driver's seat and from said arm structure, a rear seat spaced rearwardly from said driver's seat and extending adjacent both rear doors, a front seat pivotally supported at its outer end adjacent the front door at the opposite side with its inner end swingable rearwardly to permit access from the front seat to the space between the rear seat and the driver's seat, a bracket mounted on said arm structure to support the inner end of said front seat when swung forwardly, a latch on said bracket for holding the inner end of the front seat in supported position, and latch operating means extending upwardly in said arm structure and provided with a pair of handles, one handle being located on the driver's seat side of said partition and the other handle being located on the side of said arm structure adjacent said front seat.

4. A motor vehicle for taxicab use comprising a closed body having front and rear doors at both sides, a driver's seat adjacent the front door at one side of the body, a rear seat spaced rearwardly from said driver's seat and extending adjacent both rear doors, and a front seat pivotally supported at its outer end adjacent the front door at the opposite side with its inner end swingable rearwardly, said front seat comprising a back and a folding seat portion adapted to be raised from a seating position to a vertical position adjacent the back, the inner side edge of said folding seat portion when in lowered position extending along the adjacent side of said driver's seat but when raised extending vertically adjacent the rear part of the driver's seat whereby the front seat may then be swung rearwardly.

5. A motor vehicle for taxicab use comprising a closed body having front and rear doors at both sides, a driver's seat adjacent the front door at one side, a rear seat spaced rearwardly from the driver's seat and extending adjacent both rear doors, a front seat pivotally supported at its outer end adjacent the front door at the opposite side with its inner end swingable rearwardly, said front seat comprising a back and a seating portion adapted to be folded from a lowered or horizontal position to a raised or vertical position adjacent said back, and means at the inner side of the driver's seat having two portions respectively for detachably supporting the inner end of the front seat when swung forwardly and for supporting said seat portion when in its lowered position.

6. A motor vehicle for taxicab use comprising a closed body having front and rear doors at both sides, a driver's seat adjacent the front door at one side of the body, a front seat comprising supporting structure pivotally supported at its outer end adjacent the front door at the opposite side with its inner end swingable rearwardly, and a seat portion carried by said supporting structure and adapted to be folded from a lowered or horizontal position to a raised or vertical position, a bracket mounted on the inner side of the driver's seat for supporting the inner end of said supporting structure independently of the seating portion and having a portion extending forwardly to receive said seat portion when the latter is in its lowered position, and manually operable latch means for holding said supporting structure when swung forwardly.

7. A motor vehicle for taxicab use comprising a closed body having front and rear doors at both sides, a driver's seat adjacent the front door at one side of the body, a rear seat spaced rearwardly from said driver's seat and extending adjacent both rear doors, a front seat comprising a supporting structure pivotally supported at its outer end adjacent the front door at the opposite side with its inner end swingable rearwardly, and a seat portion, said supporting structure pivotally supporting said seat portion on an axis extending adjacent the rear edge of the latter and provided with a bar parallel to but spaced forwardly from said pivotal axis and adapted to support said seat portion when the latter is in its lowered position, a bracket mounted on the inner side of said driver's seat and adapted to support the inner end of said bar when said front seat is swung forwardly and to support said seat portion when the latter is in its lowered position, and manually releasable latch means engageable with the inner end of said bar.

8. A motor vehicle for taxicab use comprising a closed body having front and rear doors at both sides, a driver's seat adjacent the front door at one side of the body and having an arm structure along its inner side, a rear seat spaced rearwardly from said driver's seat and extending adjacent both rear doors, a front seat normally extending from the driver's seat to the front door at the opposite side and being shiftable rearwardly to permit access from said front seat to the space between the rear seat and the driver's seat, a permanent partition extending upwardly from the rear of said driver's seat, and a swingable partition extending upwardly from said arm structure to permit access from the driver's seat to said front seat.

9. A motor vehicle for taxicab use comprising a closed body having front and rear doors at both sides, a driver's seat adjacent the front door at one side of the body and having an arm structure along its inner side, a rear seat spaced rearwardly from said driver's seat and extending adjacent both rear doors, a front seat normally extending from said arm structure to the front door at the opposite side and shiftable rearwardly to permit access from the front seat to the space between the rear seat and the driver's seat, a permanent partition extending upwardly from the rear of said driver's seat, a swingable partition extending upwardly from said arm structure and pivotally supported by said permanent partition, latch means at the front of said arm structure for releasably securing said swingable partition thereto, and manually operable means on the driver's seat side of said swingable partition for releasing said latch means.

GEORGE E. GRIMM.

REFERENCES CITED

The following references are of record in the file of this patent:

UNITED STATES PATENTS

| Number | Name | Date |
|---|---|---|
| 935,633 | Barber | Oct. 5, 1909 |
| 1,156,834 | Borland | Oct. 12, 1915 |
| 1,514,124 | Bauer | Nov. 4, 1924 |
| 1,611,248 | Smith et al. | Dec. 21, 1926 |
| 1,923,466 | West | Aug. 22, 1933 |
| 2,063,388 | Larsen | Dec. 8, 1936 |

FOREIGN PATENTS

| Number | Country | Date |
|---|---|---|
| 221,390 | Great Britain | Sept. 11, 1924 |